(12) United States Patent
Schmidt et al.

(10) Patent No.: US 7,920,683 B2
(45) Date of Patent: Apr. 5, 2011

(54) METHOD AND TESTING DEVICE FOR VERIFYING THE CHARGE INVOICING FOR A COMMUNICATIONS CONNECTION ACCORDING TO TIME-UNIT INTERVALS

(75) Inventors: Monika Schmidt, Nuernberg (DE); Ernst Schneider, Langenzenn (DE)

(73) Assignee: Deutsche Telekom AG, Bonn (DE)

( * ) Notice: Subject to any disclaimer, the term of this patent is extended or adjusted under 35 U.S.C. 154(b) by 1484 days.

(21) Appl. No.: 10/533,457

(22) PCT Filed: Jul. 17, 2003

(86) PCT No.: PCT/DE03/02394
§ 371 (c)(1),
(2), (4) Date: Oct. 6, 2005

(87) PCT Pub. No.: WO2004/040888
PCT Pub. Date: May 13, 2004

(65) Prior Publication Data
US 2006/0109963 A1    May 25, 2006

(30) Foreign Application Priority Data

Oct. 31, 2002  (DE) .................................. 102 51 143

(51) Int. Cl.
*H04M 15/00* (2006.01)
(52) U.S. Cl. ................. 379/114.01; 379/91.01
(58) Field of Classification Search .............. 379/124, 379/131, 114.01
See application file for complete search history.

(56) References Cited

U.S. PATENT DOCUMENTS 4,065,640 A * 12/1977 Rouiller .................... 379/114.01
4,263,482 A    4/1981 Serres et al.
4,485,270 A * 11/1984 Honda et al. .................. 379/124

FOREIGN PATENT DOCUMENTS

FR    2538198 A    6/1984
FR    2541541 A    8/1984

* cited by examiner

*Primary Examiner* — Simon Sing
*Assistant Examiner* — Simon King
(74) *Attorney, Agent, or Firm* — Kenyon & Kenyon LLP

(57) ABSTRACT

A testing device and a method for verifying the charge invoicing for a communications device according to time unit intervals is provided. A testing device, which can simulate at least one calling analog terminal and at least one called terminal, is connected to a network node that generates time pulses. At least one predetermined test communications connection is set up and terminated over at least the one network node. Further, the time interval between the beginning of the test communications connection and the generation of a first time pulse is determined and verified to ascertain whether the determined time interval is located within a first predetermined time domain. During the existing test communications connection, time unit intervals of successive time pulses are measured and compared with a predetermined time interval. A further method involving receipt of additional time pulse(s) after the termination of the test communications connection is also provided.

11 Claims, 1 Drawing Sheet

METHOD AND TESTING DEVICE FOR VERIFYING THE CHARGE INVOICING FOR A COMMUNICATIONS CONNECTION ACCORDING TO TIME-UNIT INTERVALS

FIELD OF INVENTION

The present invention relates to a testing device and a method for verifying the charge invoicing for a communications connection according to time-unit intervals, where a testing device able to simulate at least one calling, analog terminal device and at least one called terminal device is connected to at least one network node that generates time pulses.

BACKGROUND INFORMATION

Analog telecommunications networks are distinguished in that, inter alia, the charge for a communications connection is calculated according to time-unit intervals. Such charge invoicing is also necessary today in the age of digital communications networks, when analog terminals, such as pay telephones, are used as a calling, terminal device.

In order to be able to determine the price of a communications connection according to time-unit intervals, a switching network node connected to the calling terminal device generates time pulses. The switching network node may transmit the generated pulses to the calling terminal device for the purpose of calculating payment, when it is, e.g. a pay telephone. Each pulse corresponds to a specific monetary value. In each instance, the connection price payable per unit time may be set by selecting the interval of consecutive pulses. The conditions for correctly calculating payment according to time-unit intervals are that a) the difference between the length of the contractually agreed-upon, time-unit interval and the length of the billed time-unit interval does not exceed a predetermined value, which is, as a rule, less than one second;
b) the first pulse is generated in the network node within a predetermined time span after the start of the communications connection; and
c) not more than y time pulses are generated after the end of the communications connection, the last time pulse only being allowed to be generated within a predetermined time span.

Until now, it is believed that there has been no testing methods and testing systems, by which the calculation of a connection price according to time-unit intervals may be validated.

Therefore, the present invention concerns the matter of providing a method and a testing device for verifying the charge invoicing for a communications connection according to time-unit intervals.

SUMMARY

An embodiment of the present invention solves this matter via a method for verifying the charge invoicing for a communications connection according to time intervals, a testing device able to simulate at least one calling, analog terminal device and at least one called terminal device being connected to at least one network node that can generate time pulses; the method comprising the following method steps:

at least one predetermined test-communications connection is set up and cleared again via at least the one network node;

the interval between the start of the test-communications connection and the generation of a first time pulse is ascertained, and it is checked if the ascertained interval is within a first predetermined time domain; during the existing test-communications connection, time-unit intervals of consecutive time pulses are measured and compared to a predetermined time interval; and it is checked if at least one additional time pulse has been received after the end of the test-communications connection; if yes, the interval between the end of the test-communications connection and the at least one time pulse is ascertained, and it is checked if the ascertained interval is within a second predetermined time domain.

An embodiment of the method employs a testing device, which may simulate at least one calling, analog terminal device and at least one called terminal device and is connected to at least one network node that generates time pulses. The network node is normally an analog or digital, switching network node. Using the testing method, at least one predetermined, test-communications connection may be set up and torn down again in the network node.

In an embodiment, the interval between the start of the test-communications connection and the generation of a first time pulse in the network node is determined, and it is checked if the ascertained interval is within a first predetermined time domain.

During the existing test-communications connection, time-unit intervals of consecutive time pulses are measured and compared to a predetermined time interval. All of the time-unit intervals occurring between the start and the end of the test-communications connection are advantageously measured.

In addition, it is checked if at least one additional time pulse has been received after the end of the test-communications connection. When this is the case, the time interval between the end of the test-communications connection and the at least one time pulse is ascertained. It is the checked if the ascertained interval is within a second predetermined time domain.

The time interval between the start of the test-communications connection and generation of the first time pulse is measured, using the following steps: The occurrence of a first predetermined event (connect; loop connection), which corresponds to the measurable start of the test-communications connection, is detected at a first predetermined measuring point of the testing device. The reception of the first time pulse of the test-communications connection, which time pulse is generated by the network node, is detected at a second predetermined measuring point of the testing device.

A time measurement is started or stopped as a function of the detected occurrence of the first predetermined event (connect; loop connection) and the reception of the first time pulse.

In an embodiment, the first measuring point is in the called terminal device, and the second measuring point is preferably in the calling, analog terminal device. The event detected at the first measuring point may be the protocol message "connect" in the case of a digital, called terminal device, or the event detected at the first measuring point may be the formation of a loop connection in the case of an analog, called terminal device.

Since the first and second measuring points are situated away from the network node, the occurrence of the actual event "start of connection", which may be at an interface of the network node, and the recording of the event "start of connection" detected at the first measuring point are separated in time. In the same manner, the reception of the first time pulse at the second measuring point and the actual generation of the first time pulse in the network node are separated in time. These temporal deviations are referred to as a systematic measuring error between the location of an actual event and the first or second measuring point that detects this event. The systematic measuring error is a function of the chosen test procedure and must therefore be ascertained for every test scenario.

In order to increase the measuring accuracy of the testing method, the systematic, temporal measuring error between the location of an actual event, which may be an interface of the network node, and the predetermined measuring point in question, which detects this event, is ascertained.

To this end, e.g., the systematic measuring error between the location of the actual occurrence of the start of the test-communications connection and the first measuring point of the testing device, and the systematic measuring error between the location of the actual generation of the first time pulse and the second measuring point of the testing device, are ascertained. The time interval between the detected occurrence of the first predetermined event and the reception of the first time pulse is measured and corrected by the amounts of the systematic measuring errors. It is then checked if the corrected interval is within the first predetermined time domain.

The time intervals of consecutive time pulses are advantageously measured, using the following steps:

The first time pulse received by the calling, analog terminal device starts a first time measurement; in each instance, each subsequent time pulse arriving at the calling, analog terminal device stops the time measurement, which has been started by the immediately preceding time pulse, and starts a further time measurement. An $i^{th}$ time measurement is started by the last time pulse of the test-communications connection. If the $i^{th}$ time measurement is not stopped by a further time pulse, then this signals the end of the connection-price calculation. In this case, the value of the $i^{th}$ time measurement is discarded. The $i^{th}$ time measurement may then be stopped, for example, after a predetermined time elapses.

Each initiated time measurement for ascertaining the time interval of two consecutive time pulses may be assigned a serial number.

At this point, it should be mentioned that the time measurements may be carried out by software or hardware. In the case of software implementation, the duration of each occurring interval between two time pulses is measured and stored in a storage device. The stored values are then compared to the predetermined time interval. In the case of hardware implementation, e.g., two timers are sufficient, which are each reset to zero after measuring the duration of a time interval, the measured value of the timer in question being written beforehand to a storage device.

Testing methods, which are used in the validation of the calculation of connection prices, must be capable of testing whether time pulses generated after the end of the connection may still occur.

To this end, the time interval between the end of the test-communications connection and a first time pulse received after the end of the test-communications connection is ascertained by the following steps:

A time measurement is initiated, when a second predetermined event (disconnect; loop interruption), which corresponds to the measurable end of the test-communications connection, occurs at the first or second predetermined measuring point of the testing device. The number of the currently active time measurement of the temporal spacing of two consecutive time pulses is simultaneously recorded. The time measurement initiated by the second predetermined event is stopped, when the first time pulse is received at the second predetermined measuring point of the testing device after the end of the test-communications connection. The value of this time measurement is compared to the second predetermined time domain, when no further time pulses are received within a predetermined time span.

It should be said that when no time pulses are received after the end of the test-communications connection, the time measurement initiated by the second predetermined event is stopped, for example, after the expiration of a predetermined period of time. In this case, the value of the time measurement is set to "0".

In general, the values of time measurements may only be evaluated, when the measurement of the time intervals of consecutive time pulses is ended. Thus, it is possible for not only one time pulse, but rather several time pulses to occur after the end of the test-communications connection. The test as to whether these time pulses were allowed to occur is carried out as follows:

The value of the time measurement for the interval between the end of the test-communications connection and the first time pulse received after the end of the test-communications connection, and the values of all time measurements for time intervals of consecutive pulses, whose numbers are greater than the number of the time measurement of the interval of two consecutive time pulses that were active at the end of the connection, are added and compared to the second predetermined time domain.

In addition, the number of time measurements, whose numbers are greater than the number of the time measurement of the interval of two consecutive time pulses, which were active at the end of the connection, may additionally be determined. From this number, it may be determined if the number of time pulses, which have occurred after the end of the test-communications connection, is less than, greater than, or equal to maximum permissible number y of time pulses.

The accuracy of the test method may be improved by more accurately calculating the interval of the actual occurrence of the end of the test-communications connection and the actual generation of time pulses.

Therefore, the systematic measuring error between the location of the actual occurrence of the end of the test-communications connection and the first and/or second measuring point of the testing device, as well as the systematic measuring error between the location of the actual generation of time pulses and the second measuring point of the testing device, are measured. The time interval between the occurrence of the second predetermined event (disconnect; loop interruption) and the reception of a subsequently occurring time pulse is measured and corrected by the amount of the systematic measuring error.

In this manner, it is taken into account that the measuring points are situated away from the network node and that, therefore, the occurrence of the actual event "end of connection", which may occur at an interface of the network node, and the detection of the event "end of connection", are separated in time. In the same manner, the reception of the last time pulse and the actual generation of the last time pulse in the network node occur at different times.

In order to be able to keep the systematic measuring errors small, the first measuring point is determined by the called terminal device, and the second measuring point is determined by the calling, analog terminal device; the test-communications connection also being able to be ended at the two terminal devices.

A useful objective of the present invention is to calculate as accurately as possible the actual, immeasurable time of the start and end of a test-communications connection, as well as the actual, immeasurable time of the generation of a time pulse.

An embodiment provides a testing device for connection to at least one network node to be tested, which may emit time pulses. The testing device has the following features:
a call simulator for simulating at least one calling, analog terminal device and for simulating at least one further terminal device, which may be operated as a called terminal device;
a first detector device for detecting time pulses;
a second detector device for detecting a first predetermined event (connect, loop closure), which corresponds to the measurable start of a test-communications connection;
the first and/or second detector device being designed to detect a second predetermined event (disconnect; loop interruption), which corresponds to the measurable end of a test-communications connection.

Additionally provided are a first time-measuring instrument for measuring, in each instance, time intervals of two consecutive time pulses;
a second time-measuring instrument for measuring the interval between the occurrence of the first predetermined event and the reception of the first time pulse of a set up test-communications connection;
a third time-measuring instrument for measuring the interval between the occurrence of the second predetermined event and the reception of at least one time pulse after the measured end of the test-communications connection;
and an evaluation device, which can compare the measured time spans of the specific time-measuring devices to corresponding, predetermined time domains. In addition, evaluation device may check if the number of time pulses occurring after the end of the test-communications connection is less than, greater than, or equal to predetermined, maximum number y of time pulses.

In order to be able to improve the measuring accuracy of the testing device, a storage device is additionally provided, in which the systematic error between the location of the actual start of the test-communications connection and the second detector device, the systematic measuring error between the location of the actual end of a test-communications connection and the first or second detector device, and the systematic measuring error between the location of the actual generation of time pulses and the first detector device of the testing device are stored. A correction device connected to the storage device is used to correct the values measured by the first, second, and third time-measuring devices by the amount of the respective systematic measuring errors.

In order to be able to test if time pulses received after the end of the test-communications connection may occur, a device, preferably the first time-measuring device, is designed to serially number consecutive time intervals. Furthermore, in response to the numbers assigned to the time intervals, the third time-measuring device can detect if a time interval has been measured in the first time-measuring device after the detection of the second predetermined event (disconnect, loop interruption). For example, the third time-measuring device or evaluation device may add the value for the interval between the end of the test-communications connection and the first time pulse received after the end of the test-communications connection and the values of all of the measured time intervals, whose numbers are, in each instance, greater than the number of the time interval, which has been instantaneously measured in response to the occurrence of the second predetermined event (disconnect; loop interruption) at the first or second detector device of the testing device.

In order to keep the systematic measuring errors as small as possible, the first detector device may be assigned to the calling, analog terminal device, the second detector device being able to be assigned to the called terminal device.

In an embodiment, a testing device and a method for verifying the charge invoicing for a communications device according to time unit intervals is provided. A testing device, which can simulate at least one calling analog terminal and at least one called terminal, is connected to a network node that generates time pulses. At least one predetermined test communications connection is set up and terminated over at least the one network node. In addition, the time interval between the beginning of the test communications connection and the generation of a first time pulse is determined and verified to ascertain whether the determined time interval is located within a first predetermined time domain. During the existing test communications connection, time unit intervals of successive time pulses are measured and compared with a predetermined time interval. Verification is also made as to whether at least one additional time pulse was received after the termination of the test communications connection. If this is the case, then the time interval between the termination of the test communications connection and the at least one time pulse is determined and verified to ascertain whether the determined time interval is located within a second predetermined time domain.

The present invention is explained in detail below on the basis of an exemplary embodiment, in conjunction with the attached drawing.

DETAILED DESCRIPTION

Figure 1:
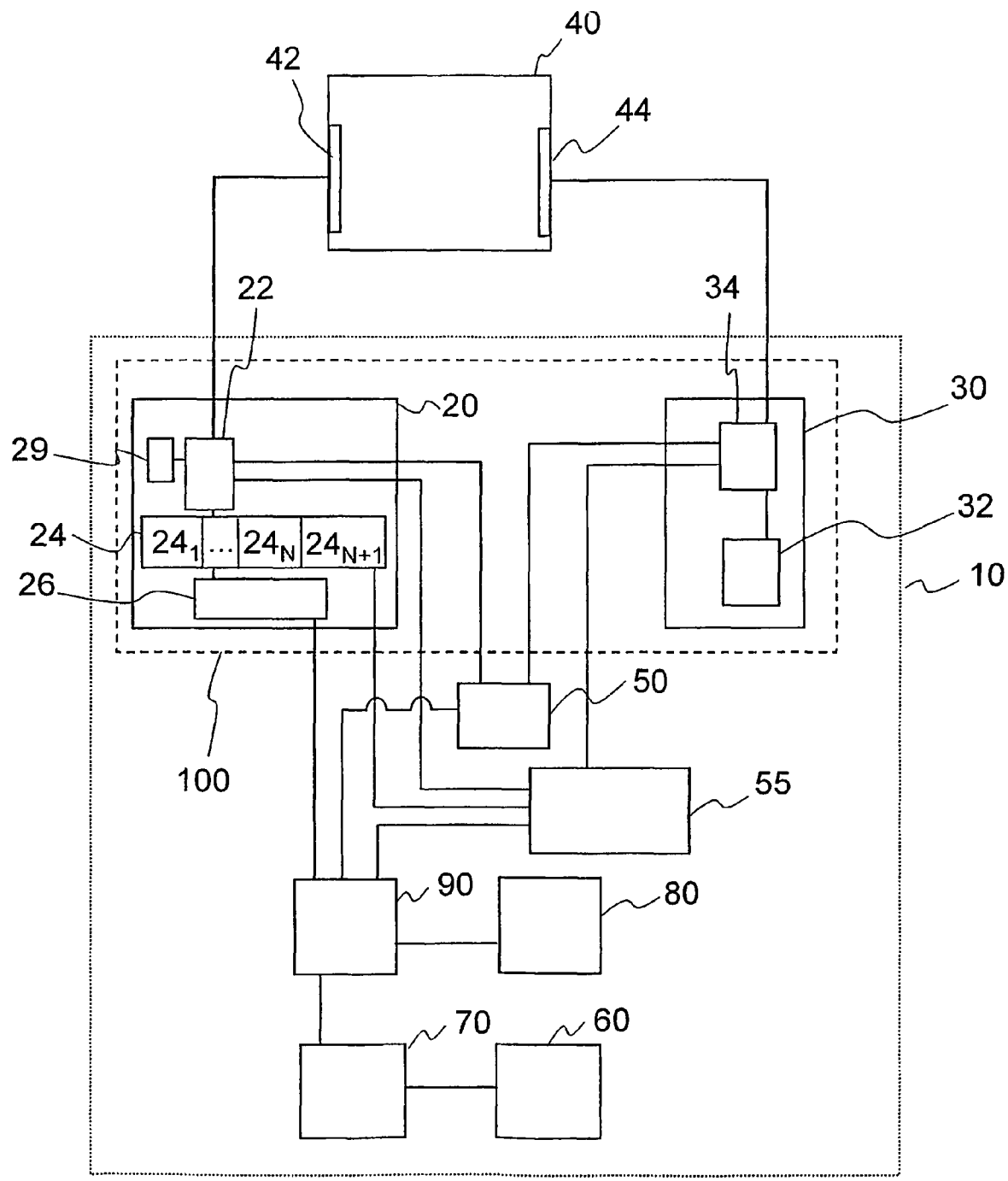
FIG. 1 shows an example testing device according to an embodiment of the present invention.

FIG. 1 shows an exemplary testing device 10, which includes at least one call simulator 100 that can simulate an analog terminal device 20 as a calling terminal device and a terminal device 30 as a called terminal device. Analog terminal device 20 is connected, via an interface 42, to a switching network node 40 to be tested. Terminal device 30, which is a digital terminal device in the present example, is connected to switching network node 40 via an interface 44. Also conceivable is a test connection, in which terminal device 30 is connected to another switching network node.

Analog terminal device 20 has a detector device 22, which may detect, inter alia, time pulses generated by network node 40. In addition, analog terminal device 20 has a time-measuring device 24, which is implemented in the form of hardware or software and is capable of measuring, in each instance, time intervals between two consecutive time pulses. Schematically represented time-measuring device 24 has, for example, N+1 timers $24_1$ through $24_{N+1}$, by which N+1 time intervals may be measured. The measured time intervals are each assigned a serial number between 1 and N+1, whose significance is described further down. The time intervals may be stored together with the corresponding number in a memory 26. Analog terminal device 20 may additionally have a generator 29, which generates a loop interruption when a test connection is ended at analog terminal device 20.

Terminal device 30 has a generator 32 for generating an event, which signals the start and possibly the end of a test connection. In the case of a digital terminal device, the protocol message "connect" or "disconnect" is generated as an event, while in the case of an analog terminal device 30, a loop closure or a loop interruption is generated as an event. These events are detected by a detector 34.

Testing device 10 has a further time-measuring device 50, which is connected, for example, to detectors 22 and 34. The interval between the start of a test connection detected at detector 34 and the first time pulse detected at detector 22 may be measured by time-measuring device 50.

In addition, a time-measuring device 55 is provided, which can measure the interval between the end of a test connection detected at detector 22 or 34 and a time pulse, which is detected at detector 22 and is generated in network node 40 after the end of the test connection. To this end, time-measuring device 55 is connected to detectors 22 and 34. Furthermore, time-measuring device 55 is connected to time-measuring device 24, in order to obtain the numbers of the measured time intervals and, in some instances, the temporal length of particular time intervals.

Stored in a storage device 80 are temporal correction values, which correspond to the systematic measuring errors between interfaces 42 and 44 of network node 40 as locations of the actual events, i.e. generation of time pulses and detection of the start and end of a connection, and to detectors 22 and 34 as a location of the measured events.

A correction device 90 is connected to storage device 26, time-measuring devices 50 and 55, and storage device 80. Since the time intervals measured in time-measuring device 24 and stored in storage device 26 do not have to be corrected, these are simply looped, together with the corresponding number, to an evaluation device 70, via only correction device 70. On the other hand, the values coming from time-measuring devices 50 and 55 are corrected in correction device 90 by the amount of the systematic measuring errors stored in storage device 80, and then transmitted to evaluation device 70.

Evaluation device 70 is also connected to a storage device 60, in which reference values are stored. For example, the reference values correspond to the predetermined time-interval length which may be a function of the selected test procedure, a predetermined interval which may be between the actual start of the connection and the generation of the first time pulse, an additional predetermined interval which defines the maximum time interval that may lie between the actual end of the test connection and the last, subsequently generated time pulse, as well as a maximum number y of time pulses which may be generated after the end of the test-communications connection. In addition, another reference value may be stored for a minimum number x of time pulses, which may be generated after the end of the test-communications connection.

A method of functioning of testing device 10 illustrated in the FIGURE is explained in detail in the following.

At this point, it is assumed that a test connection should be established from analog terminal device 20 to terminal device 30 via switching node 40. Analog terminal device 20 transmits, inter alia, the call number of terminal device 30 to the network node, which then transmits a ringing signal to terminal device 30. From the received call number, network node 40 ascertains the contractual length of the time intervals, which are relevant to the calculation of the connection costs. The length of this time interval is stored in memory 60 as a reference value for the selected test connection.

In response to the ringing signal, e.g. the lifting of the telephone receiver is simulated in terminal device 30. The protocol message "connect" generated in generator 32 is then transmitted to interface 44 of network node 40. In the present example, the protocol message "connect" is initially detected in detector device 34, which subsequently initiates a time measurement with the aid of time-measuring device 50.

In response to the reception of the protocol message "connect" at interface 44, network node 40 transmits a first time pulse, the so-called starting pulse, to analog, calling terminal device 20. Detector 22 detects the received starting pulse and stops timer 50. Therefore, the measurement of the time interval between the generation of the protocol message "connect" and the reception of the starting pulse is also ended at analog terminal device 20.

This starting pulse (first counting pulse) may deviate by, at most, a first predetermined time span from the actual start of the connection.

The time interval measured by clock 50 is subject to a systematic measuring error. The reason for the systematic measuring error is that the measuring points, locations in analog terminal device 20 and in terminal device 30, are not the locations of the actual events, for, in the present example, the locations, at which the starting pulse is actually emitted and the start of the connection (reception of protocol message "connect") actually occurs, are interfaces 42 and 44 of network node 40. The time deviation, which is caused by the separation of the locations at which the events actually occur and the measuring points at which these events are measured, represents the systematic measuring error, which is ascertained prior to the start of the test and stored in memory 80. In the present example, the systematic measuring error approximately corresponds to the signal propagation time of the protocol message "connect" from terminal device 30 to network node 40 and the signal propagation time of the starting pulse from network node 40 to analog terminal device 20. Therefore, time-measuring device 50 supplies the measured time interval to correction device 90, in which the time interval is corrected by the amount of the systematic measuring error.

In evaluation device 70, the corrected interval is compared to the corresponding reference value from memory 60, in order to be able to determine if the time between the two events is, at a maximum, the first predetermined time span.

During the existing connection, network node 40 continually sends time pulses to analog terminal device 20, which are detected by detector 22.

In each instance, the spacing of two consecutive time pulses may not exceed the allowable tolerance. Therefore, the maintenance of this tolerance must be monitored up to the end of the test connection and, in some cases, permanently.

Initially, the starting pulse starts first timer $24_1$ of time-measuring device 24, the next time pulse stops first timer $24_1$ and starts the second timer, etc., until the last time pulse received during the existing test connection stops timer $24_{N-1}$ and starts timer $24_N$. At the same time, each measured time interval is assigned a serial number. The numbers and the corresponding time intervals are stored in storage device 26. A time pulse following the measured end of the connection stops timer $24_N$ and starts timer $24_{N+1}$. Timer $24_{N+1}$ may be stopped when, after the end of the test connection, no further time pulse is received within a predetermined time span, which has a length of, e.g. two time intervals. The content of timer $24_{N+1}$ is then discarded.

The time intervals stored in memory 26 are transmitted uncorrected, together with the corresponding numbers, to evaluation device 70 via correction device 90. Therefore, it is not necessary to correct the length of the time intervals.

The reason for this is that, in the case of this testing device, the systematic measuring error results, on one hand, from the propagation time of the time pulses from network node 40 to analog terminal device 20, and on the other hand, from the processing speed of testing device 10. The result of the two is that, in testing device 10, the event "network node 40 sends time pulse" is only detected with a time delay. This delay may be regarded as constant. Therefore, the measurement of the interval length yields a systematic measuring error of ±0 ms.

Evaluation device 70 compares the measured time intervals to the reference time interval stored in memory 60 and checks if the permissible tolerance is maintained.

Now it is assumed that the test connection is ended at terminal device 30. In this case, the event "telephone receiver hung up" is simulated in terminal device 30. Generator 32 then transmits the protocol message "disconnect" to interface 44 of network node 40. In the present example, the protocol message "disconnect" is detected by detector 34, which consequently starts time-measuring device 55. At the same time, testing device 10 determines number N of currently active timers $24_N$.

Two cases are subsequently considered. In the first case, only one time pulse is received in analog terminal device 20, after the protocol message "disconnect" has been generated by generator 32. In the second case, two more time pulses are received in analog terminal device 20, after the protocol message "disconnect" has been generated by generator 32. If more than two time pulses are received in terminal device 20, the method of functioning of the testing device corresponds to the second case.

The first embodiment case will be discussed first.

It is assumed that one more time pulse is detected by detector 22, after the protocol message "disconnect" has been generated by generator 32. In response to the reception of this time pulse, time-measuring device 55 and timer $24_N$ are stopped, while timer $24_{N+1}$ is started.

The value of time-measuring device 55 corresponds to the interval between the generation of the protocol message "disconnect" and the reception of the one time pulse.

However, this measured interval must still be corrected in correction device 90 by the amount of the systematic measuring error stored in memory 80.

For, as mentioned above, the measuring points in terminal device 20 and in terminal device 30 are not the locations of the actual events "end of connection" and "generation of a time pulse". This is because, in the present example, the locations at which the time pulse is actually emitted and the end of the connection (reception of protocol message "disconnect") actually occurs are interfaces 42 and 44, respectively, of network node 40. The time deviation, which is caused by the separation of the locations at which the events actually occur and the measuring points at which these events are measured, represents a systematic measuring error, which is stored in memory 80. In the present example, the systematic measuring error approximately corresponds to the signal propagation time of the protocol message "disconnect" from terminal device 30 to network node 40 and the signal propagation time of a time pulse from network node 40 to analog terminal device 20.

The corrected value is transmitted, together with number N, to evaluation device 70, where it is compared to the second predetermined time value, in order to be able to determine if the corrected value is less than or equal to the second predetermined time value. In addition, evaluation device 70 can also check if the number of time pulses occurring after the end of the test-communications connection is in the interval between x and y.

The second case will now be discussed, in which exactly two time pulses are received in analog terminal device 20, after the protocol message "disconnect" has been generated by generator 32.

It is assumed that a first time pulse is detected by detector 22, after the protocol message "disconnect" has been generated by generator 32. In response to the reception of this first time pulse, time-measuring device 55 and timer $24_N$ are stopped, while timer $24_{N+1}$ is started. In addition, the time interval measured by timer $24_N$ is assigned serial number N.

A second time pulse is detected by detector 22. In response to the second time pulse, timer $24_{N+1}$ is stopped, and the time interval measured by timer $24_{N+1}$ is assigned serial number N+1.

Using the serial number of timer $24_{N+1}$, time-measuring device 55 may detect that after the protocol message "disconnect" has been generated by generator 32, a complete time interval N+1 has been measured, and the time-measuring device adds this value to the value of time-measuring device 55, which corresponds to the time interval between the generation of the protocol message "disconnect" and the reception of the first time pulse.

The time interval ascertained in time-measuring device 55 is still corrected in correction device 90 by the amount of the systematic measuring error stored in storage device 80, and transmitted, together with number N, to evaluation device 70.

Evaluation device 70 checks if the calculated value is less than or equal to the second predetermined time span.

In addition, evaluation device 70 may also check if the number of time pulses occurring after the end of the test-communications connection is in the interval between x and y.

As seen, the number of the currently running timer of time-measuring device 24 must be registered by testing device 10 at the start of timer 55, in order to be able to carry out the described evaluation of the measuring results.

In an embodiment, the location of the measuring points is selected so as to render the corresponding systematic measuring error as small as possible. Thus, for the above-mentioned example, the measuring point in which the event "start of connection" is detected is located in called terminal device 30. The measuring point, in which the event "end of connection" is detected, is also in the terminal device 30 at which the connection was ended.

What is claimed is:

1. A method for verifying charge invoicing for a communications connection according to time intervals, a testing device able to simulate at least one calling analog terminal device and at least one called terminal device being connected to at least one network node that can generate time pulses, the method comprising:
    at least one predetermined test-communications connection is set up and cleared again via at least the one network node;
    ascertaining the respective time interval between a start of the test-communications connection and a generation of a first time pulse;
    determining if the ascertained respective time interval is within a first predetermined time domain;
    during the test-communications connection, measuring time-unit intervals of consecutive time pulses and comparing the measured time-unit intervals of consecutive time pulses to a predetermined time interval; and
    determining if at least one additional time pulse has been received after an end of the test-communications connection, wherein if the at least one additional time pulse has been received after an end of the test-communications connection then the interval between the end of the test-communications connection and the at least one time pulse is ascertained, and a determination of whether the ascertained interval is within a second predetermined time domain is made, and wherein the time interval between the start of the test-communications connection and the generation of the first time pulse is ascertained by:
  detecting an occurrence of a first predetermined event, which corresponds to a measurable start of the test-communications connection, at a first predetermined measuring point of the testing device;
  detecting a reception of a first time pulse of the test-communications connection generated by a network node at a second predetermined measuring point of the testing device; and
  as a function of the detected occurrence of the first predetermined event and the reception of the first time pulse, effecting one of starting and stopping a time measurement is started or stopped, wherein a systematic measuring error between a location of an actual occurrence of the start of the test-communications connection and a first measuring point of the testing device is ascertained, a systematic measuring error between a location of an actual generation of the first time pulse and a second measuring point of the testing device is ascertained, an interval between a detected occurrence of the first predetermined event and the reception of the first time pulse is measured and corrected by an amount of the systematic measuring error; and a determination is made whether a corrected interval is within the first predetermined time domain.

2. The method as recited in claim 1, wherein the first measuring point is defined by the called terminal device; and the second measuring point is defined by the calling analog terminal device, wherein the test-communications connection also being able to be ended at the two terminal devices.

3. The method as recited in claim 1, wherein the first predetermined event is at least one of a connect and a loop connection, and the second predetermined event is at least one of a disconnect and a loop interruption.

4. A method for verifying charge invoicing for a communications connection according to time intervals, a testing device able to simulate at least one calling analog terminal device and at least one called terminal device being connected to at least one network node that can generate time pulses, the method comprising:
  at least one predetermined test-communications connection is set up and cleared again via at least the one network node;
  ascertaining the respective time interval between a start of the test-communications connection and a generation of a first time pulse;
  determining if the ascertained respective time interval is within a first predetermined time domain;
  during the test-communications connection, measuring time-unit intervals of consecutive time pulses and comparing the measured time-unit intervals of consecutive time pulses to a predetermined time interval; and
  determining if at least one additional time pulse has been received after an end of the test-communications connection, wherein if the at least one additional time pulse has been received after an end of the test-communications connection then the interval between the end of the test-communications connection and the at least one time pulse is ascertained, and a determination of whether the ascertained interval is within a second predetermined time domain is made, wherein time intervals of consecutive time pulses are measured, by:
  starting a first time measurement by the first time pulse received by a calling analog terminal device, stopping time measurement by each subsequent time pulse received by the calling analog terminal device, wherein the time measurement was started by a respective immediately preceding time pulse which then starts a further time measurement, starting an $i^{th}$ time measurement by a last time pulse of the test-communications connection,
  wherein each initiated time measurement is assigned a serial number, wherein the time interval between the end of the test-communications connection and a first time pulse received after the end of the test-communications connection is ascertained, by:
  initiating a time measurement when a second predetermined event, which corresponds to a measurable end of the test-communications connection, occurs at a first or second predetermined measuring point of the testing device, stopping a time measurement initiated by the second predetermined event when the first time pulse is received at a second predetermined measuring point of the testing device after an end of the test-communications connection; and
  comparing a value of the time measurement to a second predetermined time domain.

5. The method as recited in claim 4, wherein, when the second predetermined event occurs at the first or second predetermined measuring point of the testing device, the number of the currently active time measurement of the time interval of two consecutive time pulses is acquired;
  the time interval between the end of the test-communications connection and further time pulses received after the end of the test-communications connection is ascertained, using the following steps:
  a value of the time measurement for a time interval between an end of the test-communications connection and the first time pulse received after the end of the test-communications connection, and values of all respective time measurements for time intervals of consecutive time pulses, whose numbers are each greater than the number of the time measurement acquired in response to the occurrence of the second predetermined event at the first or second predetermined measuring point of the testing device, are added and compared to a second predetermined time domain.

6. The method as recited in claim 4, wherein systematic measuring errors between the location of the actual occurrence of the end of the test-communications connection and at least one of the first and second measuring point of the testing device is ascertained;
  a systematic measuring error between a location of an actual generation of time pulses and a second measuring point of the testing device is ascertained;
  a time interval between an occurrence of the second predetermined event and the reception of the first time pulse occurring after the end of the test-communications connection is measured and corrected by the amount of the systematic measuring error.

7. The method as recited in claim 4, wherein the first predetermined event is at least one of a connect and a loop connection, and the second predetermined event is at least one of a disconnect and a loop interruption.

8. A testing device for connection to and testing of at least one network node, the at least one network node being capable of emitting time pulses, comprising:
a call simulator for simulating at least one calling analog terminal device and for simulating at least one further terminal device operatable as a called terminal device;
a first detector device for detecting time pulses;
a second detector device for detecting a first predetermined event which corresponds to a measurable start of a test-communications connection, wherein at least one of the first and second detector device is designed to detect a second predetermined event which corresponds to a measurable end of a test-communications connection;
a first time-measuring device for measuring, in each instance, time intervals of two consecutive time pulses;
a second time-measuring device for measuring an interval between an occurrence of the first predetermined event and a reception of a first time pulse of a set up test-communications connection;
a third time-measuring device for measuring an interval between an occurrence of the second predetermined event and a reception of at least one time pulse after the measured end of the test-communications connection; and
an evaluation device for comparing measured time spans of the respective time-measuring devices to corresponding predetermined time domains;
a storage device, in which a systematic measuring error between a location of an actual start of a test-communications connection and the second detector device is stored, and in which a systematic measuring error between a location of an actual end of a test-communications connection and one of the first and the second detector device is stored, and in which a systematic measuring error between a location of an actual generation of time pulses and the first detector device of the testing device is stored;
a correction device connected to the storage device for correcting values measured by the first, second, and third time-measuring devices by an amount of specific systematic measuring error; and
an evaluation device designed to compare the measured and corrected time spans to corresponding, predetermined time domains.

9. The testing device as recited in claim 8 further comprising:
a device for serially numbering consecutive time intervals;
in response to numbers assigned to the time intervals, the third time-measuring device detects if a time interval has been measured in the first time-measuring device after a detection of the second predetermined event; and
one of the third time-measuring device and the evaluation device add the value for the interval between the end of the test-communications connection and the first time pulse received after the end of the test-communications connection and the values of all of the measured time intervals, whose numbers are, in each instance, greater than a number of a time interval that has been instantaneously measured in response to an occurrence of a second predetermined event at one of the first and second detector device of the testing device.

10. The testing device as recited in claim 8, wherein the first detector device is assigned to the calling analog terminal device, and the second detector device is assigned to the called terminal device.

11. The testing device as recited in claim 8, wherein the first predetermined event is at least one of a connect and a loop connection, and the second predetermined event is at least one of a disconnect and a loop interruption.

* * * * *